US012671102B2

(12) United States Patent　　　(10) Patent No.:　US 12,671,102 B2
Her et al.　　　　　　　　　　　　(45) Date of Patent: 　Jun. 30, 2026

(54) FUEL CELL SYSTEM

(71) Applicant: KOLON INDUSTRIES, INC., Seoul (KR)

(72) Inventors: Jung Kun Her, Seoul (KR); Kyoung Ju Kim, Seoul (KR); Woong Jeon Ahn, Seoul (KR); Hyoung Mo Yang, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 492 days.

(21) Appl. No.: 18/262,602

(22) PCT Filed: Jan. 24, 2022

(86) PCT No.: PCT/KR2022/001231
§ 371 (c)(1),
(2) Date: Jul. 24, 2023

(87) PCT Pub. No.: WO2022/177188
PCT Pub. Date: Aug. 25, 2022

(65) Prior Publication Data
US 2024/0079619 A1　　Mar. 7, 2024

(30) Foreign Application Priority Data

Feb. 16, 2021　(KR) ........................ 10-2021-0020520

(51) Int. Cl.
| | |
|---|---|
| *H01M 8/0662* | (2016.01) |
| *H01M 8/04082* | (2016.01) |
| *H01M 8/04111* | (2016.01) |
| *H01M 8/04119* | (2016.01) |

(52) U.S. Cl.
CPC ...... *H01M 8/0662* (2013.01); *H01M 8/04111* (2013.01); *H01M 8/04126* (2013.01); *H01M 8/04201* (2013.01)

(58) Field of Classification Search
CPC ........... H01M 8/0662; H01M 8/04089; H01M 8/04126; H01M 8/04111; H01M 8/04201; B01D 45/16
See application file for complete search history.

(56) References Cited

U.S. PATENT DOCUMENTS

| | | | |
|---|---|---|---|
| 8,974,568 B2 | 3/2015 | Hofer | |
| 2007/0264554 A1 | 11/2007 | Fujita | |

(Continued)

FOREIGN PATENT DOCUMENTS

| | | |
|---|---|---|
| CN | 100444442 C | 12/2008 |
| JP | S52-44467 A | 4/1977 |
| JP | S57-49557 U | 3/1982 |

(Continued)

OTHER PUBLICATIONS

JP OA dated Jun. 18, 2024.

(Continued)

*Primary Examiner* — Sarah A. Slifka
(74) *Attorney, Agent, or Firm* — Harvest IP Law, LLP

(57) ABSTRACT

Disclosed is a fuel cell system. The fuel cell system of the present invention is characterized by a gas-liquid separator for removing foreign substances in air between a stack and an air supply unit. So the present invention can therefore prevent the foreign substances from being supplied to the stack and improve the function and extend the lifetime of the stack.

10 Claims, 7 Drawing Sheets

(56) References Cited

U.S. PATENT DOCUMENTS

| | | | |
|---|---|---|---|
| 2010/0051521 A1 | 3/2010 | Morse | |
| 2014/0377675 A1 | 12/2014 | Peterson | |

FOREIGN PATENT DOCUMENTS

| | | | |
|---|---|---|---|
| JP | H0757750 | A | 3/1995 |
| JP | 2001187353 | A | 7/2001 |
| JP | 2002-221196 | A | 8/2002 |
| JP | 2002-373698 | A1 | 12/2002 |
| JP | 2004186118 | A | 7/2004 |
| JP | 2004200055 | A | 7/2004 |
| JP | 2005-332810 | A | 12/2005 |
| JP | 2008-038713 | A | 2/2008 |
| JP | 5467180 | B1 | 4/2014 |
| JP | 6087009 | B1 | 3/2017 |
| KR | 10-2007-0038513 | A | 4/2007 |
| KR | 20070038513 | A | 4/2007 |
| KR | 101781485 | B1 | 9/2017 |
| KR | 10-2018-0068058 | A | 6/2018 |
| KR | 20180068058 | A | 6/2018 |
| KR | 10-2019-0123979 | A | 11/2019 |
| KR | 20190123979 | A | 11/2019 |
| WO | 2004/020106 | A1 | 3/2004 |
| WO | 2016-19197 | A1 | 2/2006 |
| WO | 2007-110904 | A1 | 10/2007 |
| WO | 2014-020837 | A1 | 2/2014 |

OTHER PUBLICATIONS

Written Decision on Registration dated Jan. 7, 2025.
Office Action from Japanese Patent Office, dated Oct. 2, 2024.
KR OA Dated May 27, 2024.
Office Action From Canadian Patent Office, Dated Oct. 7, 2025.
European search report Oct. 4, 2024 for a corresponding EP patent application.

FUEL CELL SYSTEM

CROSS REFERENCE TO RELATED APPLICATION

This application is a National Stage filing under 35 U.S.C. 371 of International Application No. PCT/KR2022/001231 filed on Jan. 24, 2022 and claims priority to Korean Patent Application No. 10-2021-0020520 filed on Feb. 16, 2021, the disclosure of which is incorporated herein by reference in its entirety.

TECHNICAL FIELD

The present technology relates to a fuel cell system.

In particular, the present technology can filter foreign substances contained in air that is supplied to a stack. Therefore, the present technology can improve a function of the stack and extend the lifetime of the stack.

BACKGROUND ART

William Gilbert conducted an experiment about an attraction difference in amber, Benjamin Franklin conducted an experiment using a kite, and Volta invented a chemical battery to achieve the discovery and development of electric energy. As a result of the experiments, the electrical energy is being generally utilized in industry and lifetime.

Electrical energy can be produced in a variety of ways. The electrical energy is mainly produced by utilizing petroleum. However, since the petroleum is predicted to be depleted someday and has an adverse effect on an environment, development of alternative energy to replace petroleum is required.

Recently, studies on methods of generating electrical energy of which there is no concern about depletion and that does not adversely affect an environment have been actively conducted, and the most popular field in this research is the field of a fuel cell.

A fuel cell produces electrical energy by utilizing a stack configured of an anode, a cathode, and an electrolyte. According to the principle of the fuel cell, hydrogen is supplied to the anode and oxygen is supplied to the cathode. Therefore, hydrogen ions and electrons are emitted from the anode to generate current, hydrogen ions and oxygen are coupled to produce water vapor in the cathode, and the water vapor is discharged.

Such a fuel cell has advantages such as high efficiency, adjustable capacity, use of various fuels, discharged material close to an environmentally friendly material, and continuous charging. Thus, the fuel cell has several advantages, but there is a problem to be solved. The problem is the supply of foreign substances to the stack. When the foreign substances are supplied to the stack, the performance and lifetime of the stack are degraded.

Most of foreign substances supplied to the stack has been found to be supplied together with the supply of oxygen. Primary foreign substances have been found to be metal pieces of an impeller of an air compressor that is utilized to supply the oxygen.

DISCLOSURE

Technical Problem

An object of the present invention is to provide a fuel cell system capable of preventing foreign substances from being supplied to a stack and extending the performance and lifetime of the stack.

Technical Solution

A fuel cell system according to an embodiment includes a fuel cell stack, a hydrogen supply unit configured to supply hydrogen to the stack, and an air supply unit configured to supply air to the stack.

The fuel cell system includes: a gas-liquid separator disposed between the stack and the air supply unit and configured to remove foreign substances from the air supplied to the stack.

The gas-liquid separator may include a housing, an air inlet formed on one side of the housing, an air outlet formed on the other side of the housing, and an air rotation portion disposed in the air inlet and configured to rotate air supplied through the air inlet.

The air rotation portion may be a closed block having an inclined shape.

The housing may include an outer housing and an inner housing disposed inside the outer housing, the air inlet may be formed in the outer housing, the air outlet may be formed in the inner housing, the air outlet may be formed to pass through the outer housing at a center of the inner housing, and the air inlet may be located at a position biased from a center of the outer housing.

The air rotation portion may be disposed along a circumference of the inner housing on the upper side of the inner housing.

The air rotation portion may be a closed block inclined in a curved shape.

A variable flow path container may be disposed between the inner housing and the air outlet.

The variable flow path container may have a diameter increasing from a lower side to the upper side.

The air inlet further may include a filter configured to filter foreign substances.

The air supply unit may include an air compressor configured to supply compressed air; and a fuel cell humidifier configured to receive the compressed air and supply moisture-containing air to the stack.

The fuel cell system may include: a flow path configured to connect the gas-liquid separator to the air supply unit.

Advantageous Effects

In the fuel cell system according to the embodiment of the present invention, it is possible to prevent foreign substances from being supplied to the stack by installing the gas-liquid separator in the flow path through which air is supplied to the stack.

MODE FOR DISCLOSURE

Figure 1:
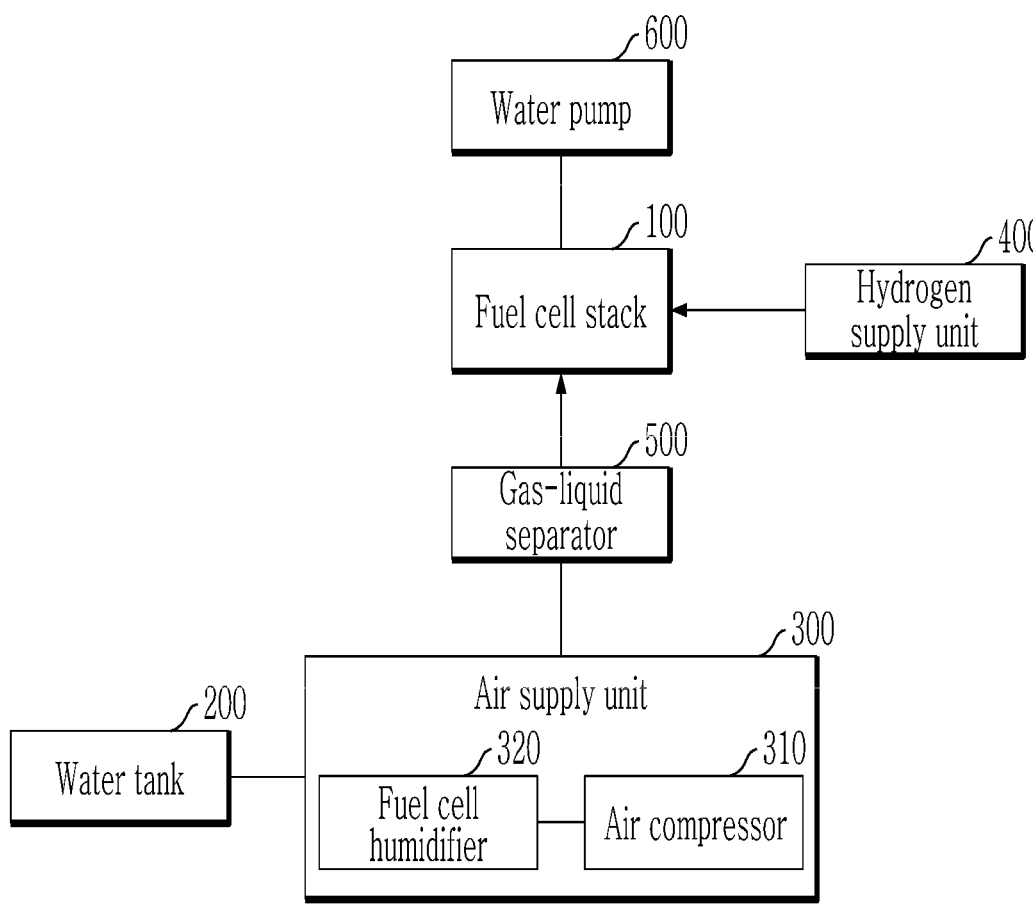
FIG. 1 is a block diagram of a configuration of a fuel cell system according to an embodiment of the present invention.

Hereinafter, embodiments of the present invention will be described in detail with reference to exemplary drawings. However, this is not intended to limit the scope of the present invention.

When components of the respective drawings are denoted by reference numerals, it should be noted that the same components are denoted by the same numerals as much as possible even when the same components are shown on different drawings. In addition, when a determination is made that detailed description of related known configurations or functions may obscure the gist of the present invention in describing the present invention, the detailed description will be omitted.

Further, sizes or shapes of components illustrated in the drawings may be exaggerated for clarity and convenience of description. In addition, terms particularly defined in consideration of a configuration and operation of the present invention are only intended to describe the embodiments of the present invention and do not limit the scope of the present invention.

FIG. 1 is a block diagram of a configuration of a fuel cell system according to an embodiment of the present invention.

A fuel cell system according to the present invention may include a stack 100, a water tank 200, an air supply unit 300, a hydrogen supply unit 400, and a gas-liquid separator 500. The present invention may further include a water pump 600.

Each of the hydrogen supply unit 400 and the air supply unit 300 supplies hydrogen and air (oxygen) to the stack 100.

The hydrogen supply unit 400 supplies stored hydrogen to the stack 100.

The air supply unit 300 may include an air compressor 310 and a fuel cell humidifier 320. Here, the fuel cell humidifier 320 may be connected to the water tank 200. Accordingly, the air supply unit 300 may supply moisture-containing air to the stack 100.

The air compressor 310 may compress air and supply the compressed air to the fuel cell humidifier 320, and the fuel cell humidifier 320 may add moisture to the compressed air and supply the resultant air to the stack 100.

The stack 100 is supplied with the hydrogen and the oxygen through an anode and a cathode, respectively. The hydrogen supplied to the anode loses electrons and becomes hydrogen ions. The hydrogen ions are located on the cathode side through the electrolyte, and hydrogen ions, oxygen, and electrons may be chemically bonded to form water vapor at the cathode.

Meanwhile, here, the water pump 600 serves to discharge water vapor generated in the stack 100. The water pump 600 may be connected to the fuel cell humidifier 320 through a flow path to supply moisture to the fuel cell humidifier 320 again.

According to an embodiment of the present invention, the gas-liquid separator 500 may be disposed between the stack 100 and the air supply unit 300. More precisely, the gas-liquid separator 500 may be disposed between the fuel cell humidifier 320 and the stack 100. The gas-liquid separator 500 may remove foreign substances from the air supplied to the stack 100.

The air compressor 310 of the air supply unit 300 rotates an impeller to compress the air. In this case, metal pieces may be generated in the impeller due to friction, and the generated metal pieces may be moved in one direction by the impeller and supplied to the stack 100. The operation efficiency of the stack 100 supplied with the metal pieces may be degraded and the lifetime of the stack 100 may be shortened.

In the present invention, the gas-liquid separator 500 is disposed between the air supply unit 300 and the stack 100 to remove foreign substances contained in the air to the stack 100. Therefore, the stack 100 can receive the air without foreign substances.

The gas-liquid separator 500 is characterized by utilizing air that is moved rapidly due to the air supply unit 300. That is, the gas-liquid separator 500 of the present invention assigns rotation force to air moving at high speed so that foreign substances in the air are removed. Therefore, the gas-liquid separator 500 can cause the air with no foreign substances to be supplied to the stack 100.

Meanwhile, when the gas-liquid separator 500 rotates the compressed air at high speed, the moisture in the air can be removed together. To solve this, a flow path may be designed between the liquid separator 500 and the fuel cell humidifier 320.

The gas-liquid separator 500 includes a discharge unit 560, and a flow path may be designed so that the discharge unit 560 is connected to the air supply unit 300. More precisely, a flow path of the discharge unit 560 may be connected to the fuel cell humidifier 320.

The discharge unit 560 may be controlled and operated by a control signal from a control unit so that a gate is opened. Accordingly, moisture separated from the air by the gas-liquid separator 500 may be supplied to the fuel cell humidifier 320 again.

On the other hand, a worker can separate the storage unit 550 (first embodiment) from a housing 540 or an outer housing 541 (second embodiment) to remove foreign substances and perform cleaning regardless of the above way. In addition, in the present invention, a filtering unit 570 may be installed in the storage unit 550 of the gas-liquid separator 500 so that the moisture is moved downward and the foreign substances are located only in the filtering unit 570.

Figure 2:
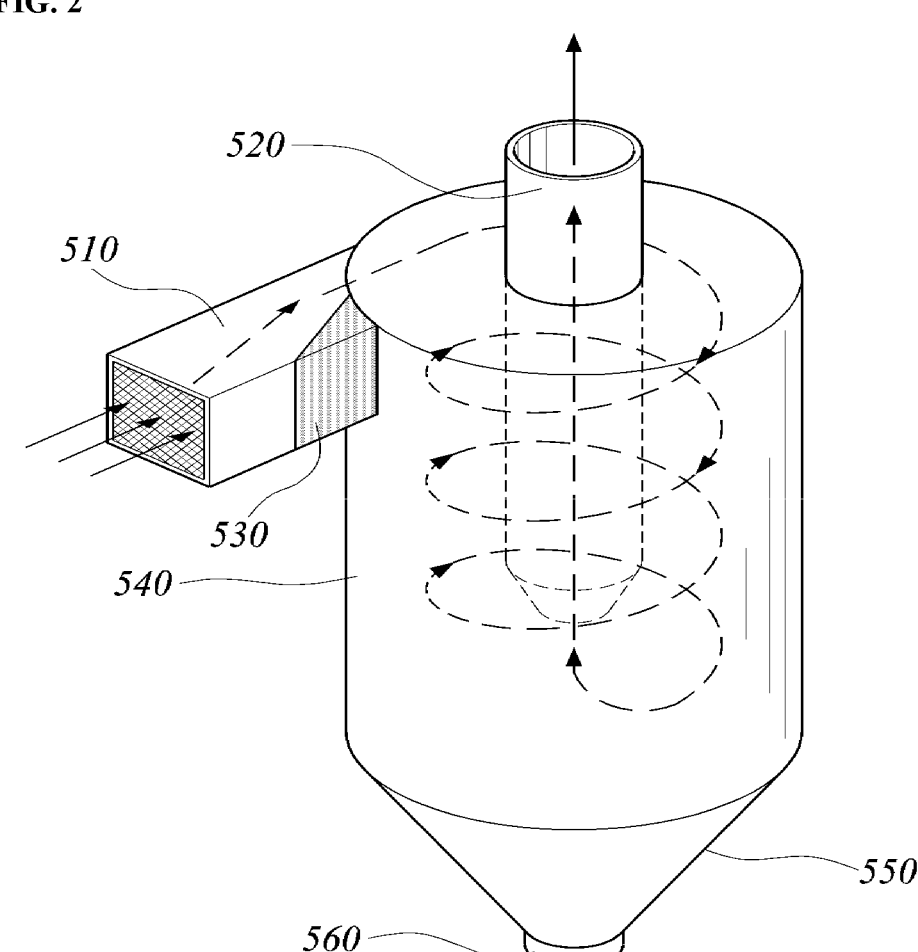
FIG. 2 is a perspective view of a gas-liquid separator according to a first embodiment.

FIG. 2 is a perspective view of the gas-liquid separator according to the first embodiment.

Figure 3:
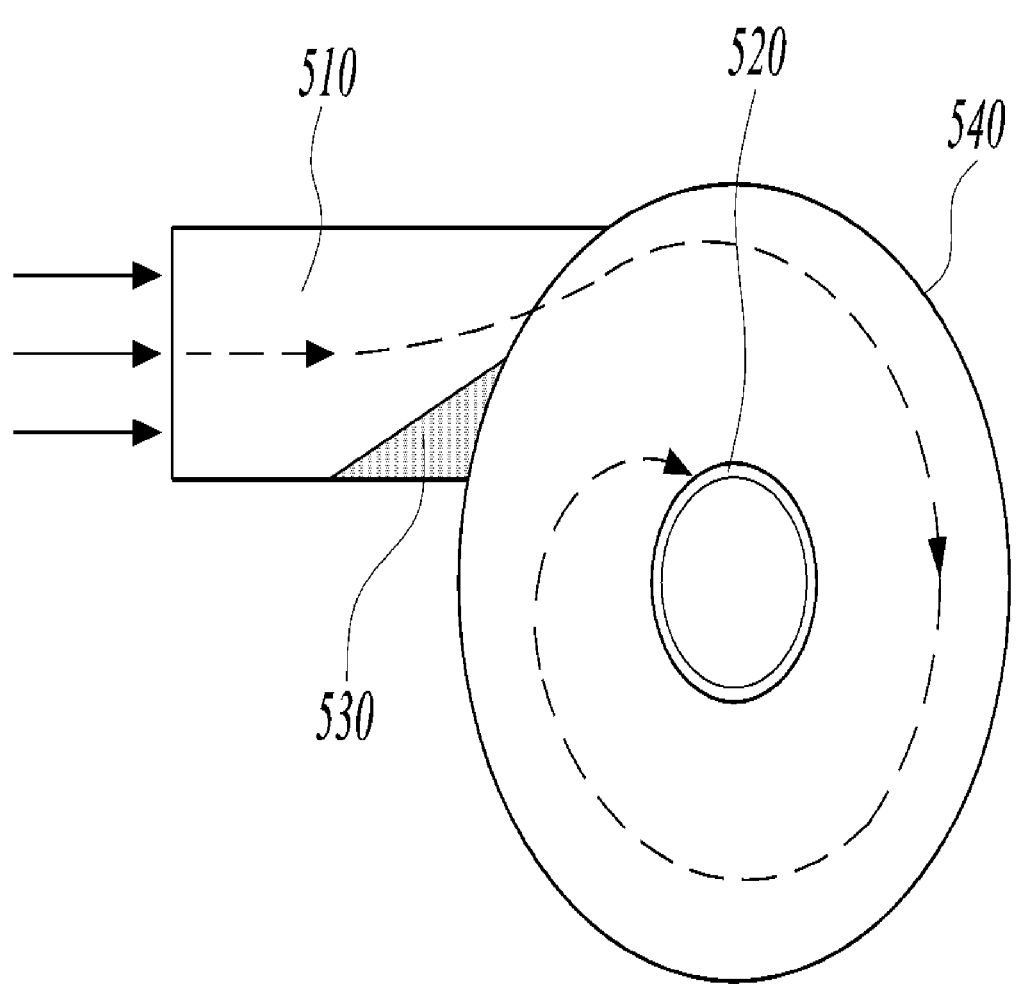
FIG. 3 is a top cross-sectional view of the gas-liquid separator according to the first embodiment.

FIG. 3 is a top cross-sectional view of the gas-liquid separator according to the first embodiment.

The gas-liquid separator 500 according to the first embodiment includes an air inlet 510, an air outlet 520, and an air rotation portion 530.

The air inlet 510 is a portion through which air containing foreign substances flows into the inside, the air outlet 520 is a portion through which air from which foreign substances have been removed is discharged, and the air outlet 520 is connected to the stack 100.

The air rotation portion 530 rapidly rotates the air flowing into the inside through the air inlet 510 so that foreign substances are removed from the air by centrifugal force.

The gas-liquid separator 500 according to the first embodiment includes the air inlet 510, the air outlet 520, the air rotation portion 530, the housing 540, the storage unit 550, and the discharge unit 560.

The housing 540 may have a cylindrical shape and may be formed to have an empty space therein.

The air inlet 510 may be formed to extend from one side of the housing 540. Further, the air outlet 520 may be formed to extend upward from the housing 540.

Thus, the air inlet 510 and the air outlet 520 can be seen from the outside of the housing 540.

The air inlet 510 may communicates with one side of the housing 540, and the air outlet 520 may be formed to communicate with the top side and extend to the inside of the housing 540.

Meanwhile, a filter may be installed in the air inlet 510 to remove large foreign substances, in addition to small foreign substances. The filter is formed in the form of a net and can remove large foreign substances. Further, an inclined closed block may be disposed in the air inlet 510.

The closed block may be the air rotation portion 530 that applies rotation force to moving air. That is, as can be seen from FIG. 3, the closed block may allow a size of a flow path of the air inlet 510 having a set size to continuously decrease from one side to the other side.

Therefore, the air passing through the air inlet 510 may pass through the flow path continuously decreasing due to the closed block, move between the housing 540 and the air outlet 520, where a size of a space decreases, and then, move while rotating between the housing 540 and the air outlet 520. Here, foreign substances contained in the air are separated from the air due to centrifugal force, are located on the inner side of the housing 540, and fall.

The air from which the foreign substances have been removed is moved to an inner space of the air outlet 520, and the air from which the foreign substances have been removed passes through the air outlet 520 and is supplied to the stack 100.

The storage unit 550 is located below the housing 540. The storage unit 550 may have a shape in which the storage unit 550 is inclined toward a center, and a cross section of the storage unit 550 may be observed as a conical shape. The storage unit 550 and the housing 540 are in communication. This makes it possible for foreign substances separated from the air to be collected in the storage unit 550. The discharge unit 560 is positioned below the storage unit 550.

The discharge unit 560 may be connected to the control unit even though the discharge unit 560 is not illustrated. The gate of the discharge unit 560 may be opened according to the control signal from the control unit. When the gate of the discharge unit 560 is opened, the foreign substances and the moisture located in the storage unit 550 may be moved to the outside of the storage unit 550.

That is, foreign substances and moisture may be supplied to the fuel cell humidifier 320 again without being filtered according to the opening of the gate of the discharge unit 560. In this case, the worker may remove the foreign substances by cleaning the fuel cell humidifier 320.

Meanwhile, the discharge unit 560 may be kept in a closed state of the gate without being operated so that the foreign substances and the moisture are stored in the storage unit 550. The storage unit 550 and the housing 540 may be configured of screw threads and coupled to or separated from each other. Accordingly, the worker may separate the storage unit 550 from the housing 540, remove the foreign substances from the storage unit 550, and then couple the storage unit 550 to the housing 540 again.

Further, the gas-liquid separator 500 may reduce noise.

That is, the gas-liquid separator 500 may rotate the air to form a unique wavelength band so that air vibrating in a specific wavelength band can be offset and noise (particularly, a low-frequency sound range) can be reduced.

For example, the gas-liquid separator 500 may generate noise due to pulsation or the like when air is supplied through the air inlet 510, and a wavelength band that offsets a wavelength band in which noise is generated is formed due to an internal structure of the gas-liquid separator 500 so that the noise can be reduced.

Figure 4:
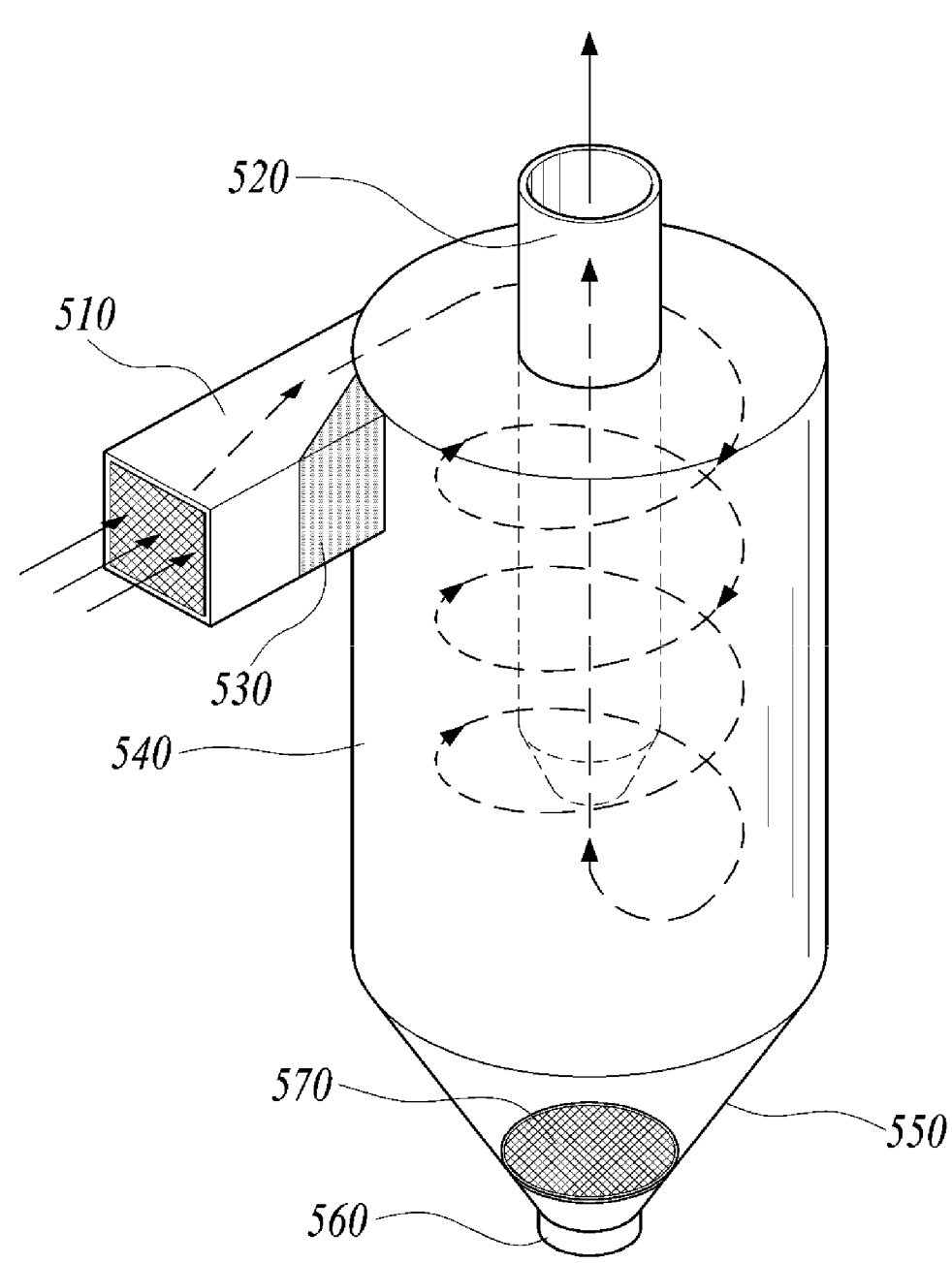
FIG. 4 is a perspective view of a gas-liquid separator according to a (1-1)-th embodiment.

FIG. 4 is a perspective view of the gas-liquid separator according to a (1-1)-th embodiment.

In the gas-liquid separator 500 according to the (1-1)-th embodiment, the filtering unit 570 may be disposed in the storage unit 550. The filtering unit 570 may pass moisture separated from the air due to rotation of the air so that only the foreign substances (metal pieces) can be located in the filtering unit 570.

The gate may be opened according to the signal from the control unit and the discharge unit 560 may supply the moisture to the fuel cell humidifier 320 again when a set amount or more of moisture is located in the storage unit 550. Here, the worker may separate the storage unit 550 from the housing 540, remove only the foreign substances located in the filtering unit 570, and then couple the storage unit 550 to the housing 540 again.

Figure 5:
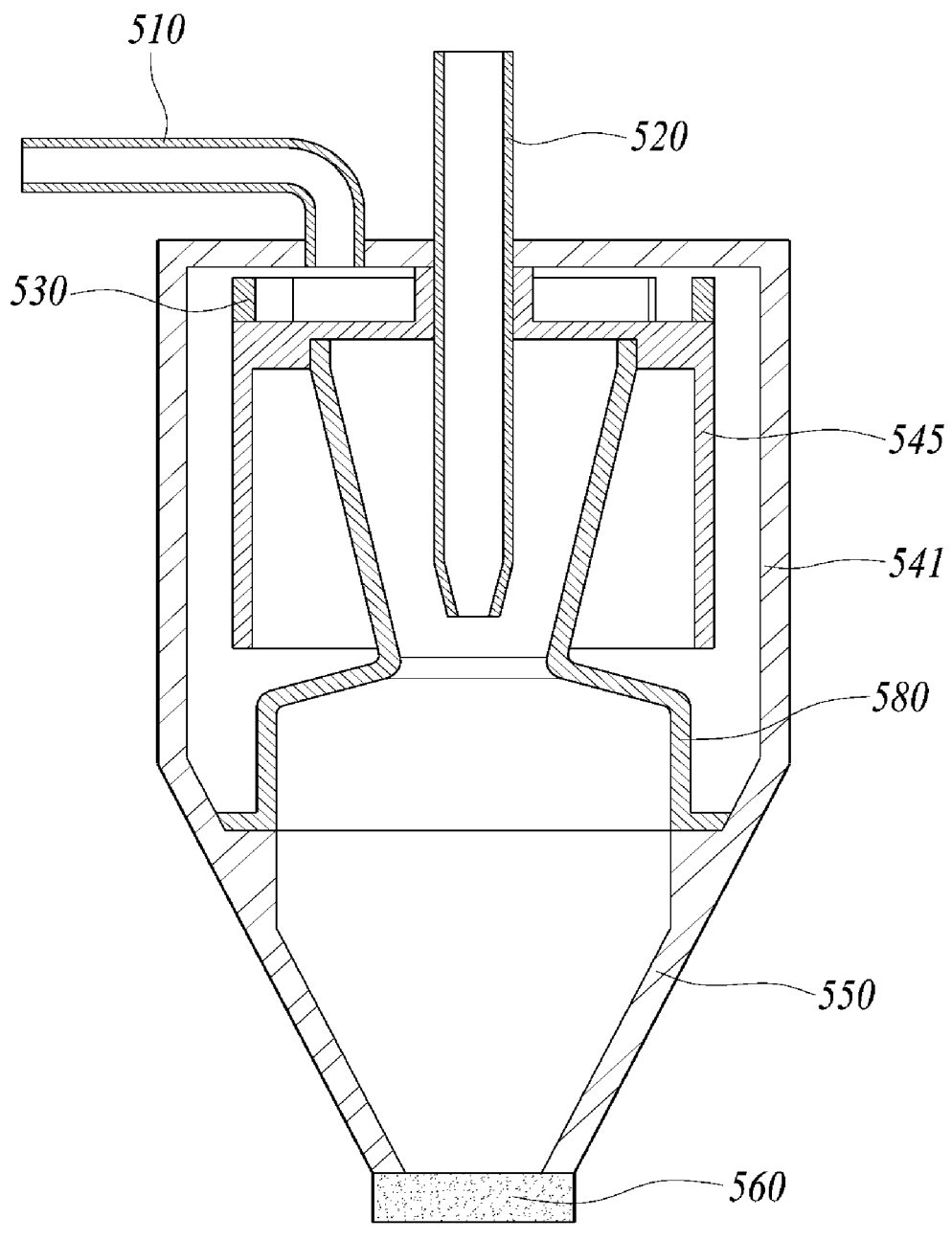
FIG. 5 is a front cross-sectional view of a gas-liquid separator according to a second embodiment.

FIG. 5 is a front cross-sectional view of a gas-liquid separator according to the second embodiment.

Figure 6:
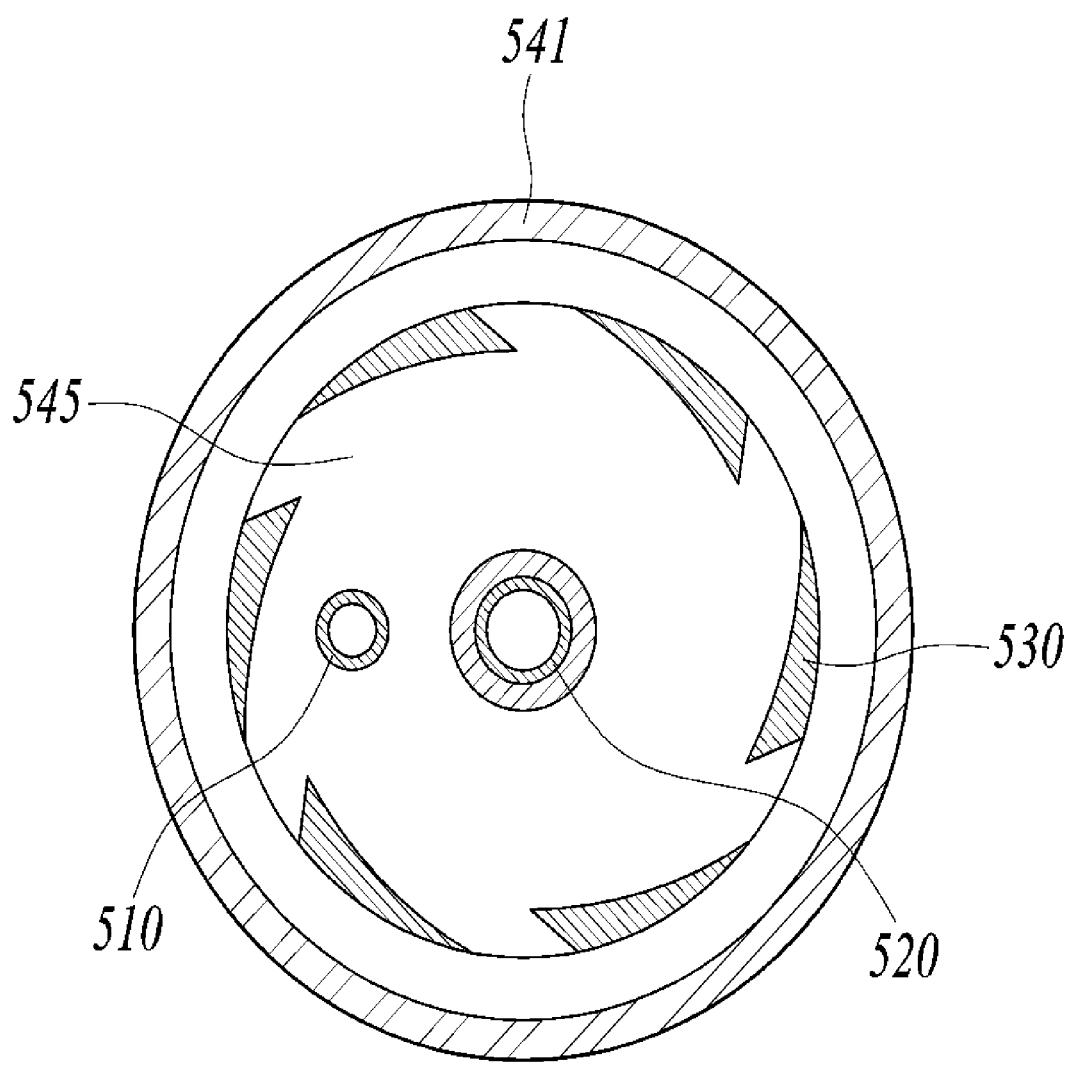
FIG. 6 is a top cross-sectional view of the gas-liquid separator according to the second embodiment.

FIG. 6 is a top cross-sectional view of the gas-liquid separator according to the second embodiment.

The constitution of the present invention in the second embodiment is similar to the constitution of the invention according to the first embodiment. However, since there are some differences, different configurations will be mainly described hereinafter.

The gas-liquid separator 500 according to the second embodiment is similar to the gas-liquid separator 500 according to the first embodiment, but may differ from the gas-liquid separator 500 according to the first embodiment in some structures. The gas-liquid separator 500 according to the second embodiment differs from the gas-liquid separator 500 according to the first embodiment in that the gas-liquid separator 500 according to the second embodiment performs removal of the foreign substances in the air twice. To this end, the gas-liquid separator 500 according to the second embodiment may further include a variable flow path container 580.

The gas-liquid separator 500 according to the second embodiment includes an air inlet 510, an air outlet 520, an air rotation portion 530, an outer housing 541, an inner housing 545, a storage unit 550, a discharge unit 560, and a variable flow path container 580.

A housing 540 according to the second embodiment includes an outer housing 541 and an inner housing 545. Here, an air inlet 510 may be formed in the outer housing 541, and the air outlet 520 may be formed in the inner housing 545.

The air inlet 510 may be located on the upper side of the outer housing 541. That is, the air inlet 510 according to the second embodiment may be located on the upper side of the outer housing 541 and move compressed air from the upper side to the lower side, unlike the air inlet 510 according to the first embodiment. A position of the air inlet 510 may be located at a position biased from a center of the outer housing 541, rather than the center.

The inner housing 545 may be formed in a cylindrical shape. The inner housing 545 may be formed with an open lower side. The inner housing 545 may be aligned with the outer housing 541 and located on the inner side of the outer housing 541.

A protrusion portion may be formed on the upper side of the inner housing 545. The protrusion portion of the inner housing 545 may come into contact with the inner side on the upper side of the outer housing 541 for coupling of the inner housing 545, and be located at a distance apart from the inner side on the upper side of the outer housing 541.

Meanwhile, the air outlet 520 may be formed on the upper side of the inner housing 545. The air outlet 520 may be located at a center of the inner housing 545. Therefore, when the inner housing 545 is aligned with the outer housing 541, the air outlet 520 is located at a position that is not on the same line as the air inlet 510.

In the case of the second embodiment, the air rotation portion 530 may be a closed block, as in the first embodiment. The closed block may include a curved inclination. The curved inclination of the closed block is formed on the inner side. That is, the curved inclination of the closed block is formed in a portion facing the air outlet 520. Further, the closed block may be located on the upper side of the inner housing 545 rather than the air inlet 510, unlike a case according to the first embodiment.

As seen from FIG. 6, the closed block may be formed in an inclined shape, and a plurality of closed blocks may be spaced apart from each other along a circumference of the inner housing 545.

In the second embodiment, the air flowing into the inside through the air inlet 510 may receive rotation force due to the circularly disposed closed blocks. That is, the air flowing into the inside through the air inlet 510 may be located on the upper side of the inner housing 545 and moved in a radial direction, and in this case, rotation force may be assigned to the air due to the closed blocks.

The air to which the rotation force has been assigned is rotated, is rotated and moved between the outer housing 541 and the inner housing 545, and is moved to the lower side. Through this movement, the foreign substances contained in the air may be primarily separated from the air by centrifugal force. The foreign substances separated from the air may be located in the storage unit 550 located on the lower side.

(On the other hand, in FIG. 5, it is seen that the storage unit 550 is blocked from the outer housing 541 by the flow path variable container 580, but it should be noted that a cutout portion is formed in the flow path variable container 580 in a portion that is not illustrated, so that foreign substances can be moved.)

One part of the variable flow path container 580 is supported by an inner side of the outer housing 541, and the other part is located between the inner housing 545 and the air outlet 520.

The variable flow path container 580 is formed to have a diameter continuously increasing from the lower side to the upper side. Accordingly, the variable flow path container 580 changes a size of a flow path between the inner housing 545 having a constant diameter and the air outlet 520.

The variable flow path container 580 is formed to have the diameter continuously increasing from the lower side to the upper side. Therefore, a size of a flow path between the inner housing 545 and the variable flow path container 580 continuously decreases from the lower side to the upper side, and air passing through the flow path is pressurized. On the other hand, since a flow path between the variable flow path container 580 and the air outlet 520 continuously decreases from the upper side to the lower side, air passing through the flow path may also be pressurized.

Meanwhile, in order to assign a rotation force to the air passing through a circumference of the variable flow path container 580, an oblique hole may be formed along the circumference of the variable flow path container 580.

In a process of secondarily removing the foreign substances from the air, the air moving while rotating between the outer housing 541 and the inner housing 545 moves between the inner housing 545 and the variable flow path container 580 through a communicated portion of the inner housing 545.

In this case, the air is accelerated since the air passes through the narrowed flow path. Thereafter, the accelerated air passes between the variable flow path container 580 and the air outlet 520. The air to which the rotation force is assigned again while passing through the hole of the variable flow path container 580 rotates again, and moves while rotating between the air outlet 520 and the variable flow path container 580. Secondarily, the foreign substances remaining in the air are separated. The foreign substances are discharged to the storage unit 550 located on the lower side along the inner side of the variable flow path container 580.

Meanwhile, the air moving between the variable flow path container 580 and the air outlet 520 may be rotated, accelerated, and moved due to the narrowed flow path.

Thereafter, the air from which the foreign substances have been removed may be moved through the lower side of the air outlet 520 and supplied to the stack 100 present outside.

Here, the foreign substances separated from the air may be located in the storage unit 550. The moisture may also be located in the storage unit 550.

The storage unit 550 may be connected to the fuel cell humidifier 320. Accordingly, when the gate of the discharge unit 560 is opened by the control unit, the moisture may be supplied to the fuel cell humidifier 320 again. Meanwhile, in this case, the foreign substances may also be supplied to the fuel cell humidifier 320. Therefore, in this case, cleaning of the fuel cell humidifier 320 may be required.

Figure 7:
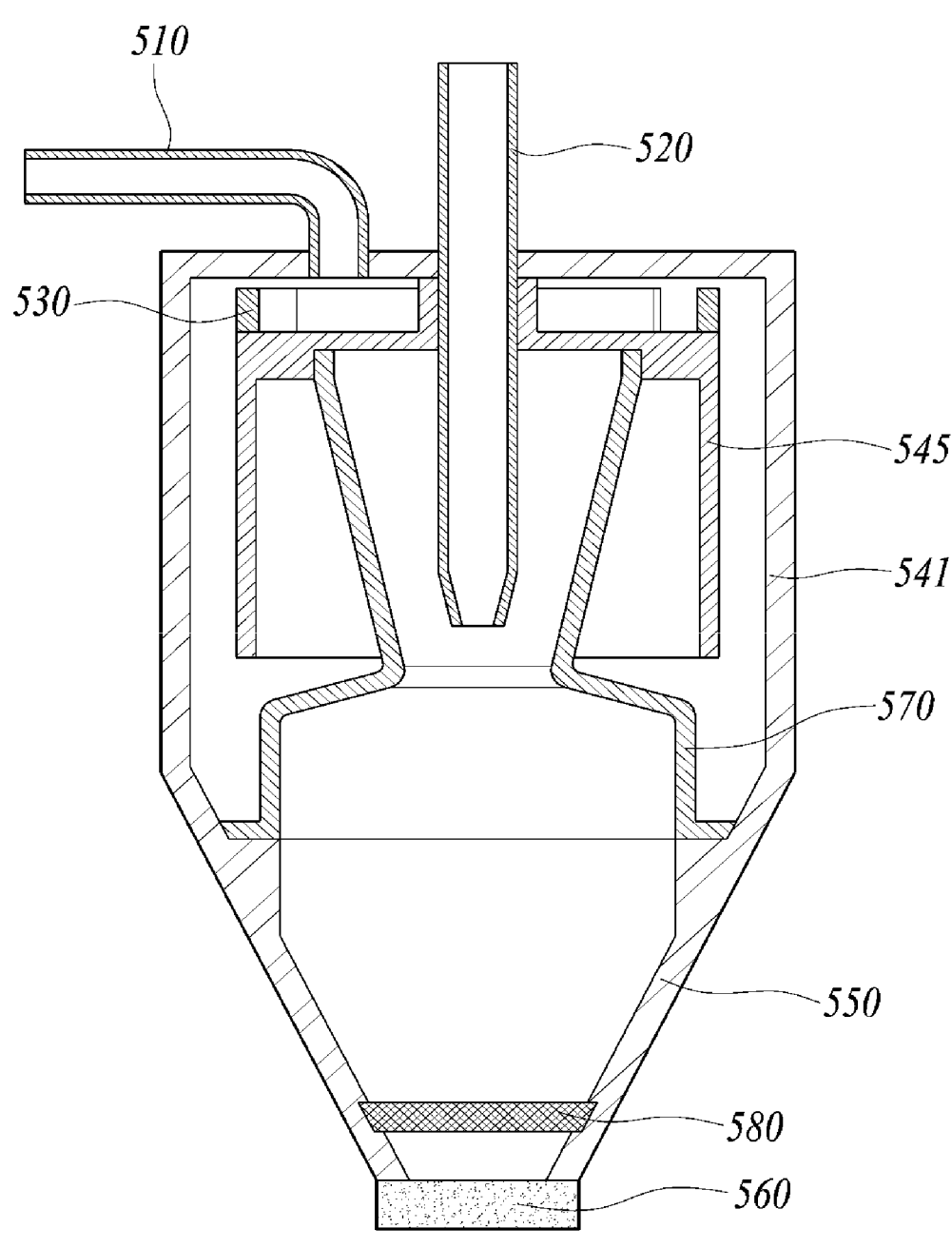
FIG. 7 is a front cross-sectional view of a gas-liquid separator according to a (2-2)-th embodiment.

FIG. 7 is a front cross-sectional view of a gas-liquid separator according to a (2-2)-th embodiment.

In the case of the (2-2)-th embodiment, a gas-liquid separator 500 may further include a filtering unit 570. The filtering unit 570 plays a role similar to that of the filtering unit 570 of Embodiment 1-1 described above. Therefore, the filtering unit 570 passes moisture to the lower side, but does not pass foreign substances.

In this case, the control unit may apply the control signal to the discharge unit 560 so that the gate can be opened and the moisture can be supplied to the fuel cell humidifier 320. If necessary, the worker may separate the storage unit 550 from the outer housing 541 and wash the filtering unit 570 to remove the foreign substances.

Although the present invention has been shown and described in relation to specific embodiments, it will be obvious to those skilled in the art that the present invention can be variously improved and changed without departing from the technical spirit of the present invention provided by the claims below.

INDUSTRIAL APPLICABILITY

The present invention is the fuel cell system, characterized by the gas-liquid separator that removes foreign substances from air in a flow path supplied to the stack, making it possible to improve the function of the stack and extend the lifetime of the stack.

The invention claimed is:

1. A fuel cell system comprising a fuel cell stack, a hydrogen supply unit configured to supply hydrogen to the stack, and an air supply unit configured to supply air to the stack, wherein the fuel cell system includes:

a gas-liquid separator disposed between the stack and the air supply unit, wherein the gas-liquid separator includes a housing, an air inlet formed on one side of the housing, an air outlet formed on the other side of the housing, and an air rotation portion disposed in the air inlet and configured to rotate air supplied through the air inlet.

2. The fuel cell system of claim 1, wherein the air rotation portion is a closed block having an inclined shape.

3. The fuel cell system of claim 1, wherein the housing includes an outer housing and an inner housing disposed inside the outer housing, the air inlet is formed in the outer housing, the air outlet is formed in the inner housing, the air outlet is formed to pass through the outer housing at a center of the inner housing, and the air inlet is located at a position biased from a center of the outer housing.

4. The fuel cell system of claim 3, wherein the air rotation portion is disposed along a circumference of the inner housing on the upper side of the inner housing.

5. The fuel cell system of claim 4, wherein the air rotation portion is a closed block inclined in a curved shape.

6. The fuel cell system of claim 3, wherein a variable flow path container is disposed between the inner housing and the air outlet.

7. The fuel cell system of claim 6, wherein the variable flow path container has a diameter increasing from a lower side to the upper side.

8. The fuel cell system of claim 1, wherein, the air inlet further includes a filter configured to filter foreign substances.

9. The fuel cell system of claim 1, wherein the air supply unit includes an air compressor configured to supply compressed air; and a fuel cell humidifier configured to receive the compressed air and supply moisture-containing air to the stack.

10. The fuel cell system of claim 1, comprising:

a flow path configured to connect the gas-liquid separator to the air supply unit.

* * * * *